B. VON RAGUE.
MUSICAL CHART.
APPLICATION FILED NOV. 17, 1920.

1,384,172. Patented July 12, 1921.

Witness:
John Enders

Inventor:
Bettie von Rague
by Fred Gerlach
his Atty.

UNITED STATES PATENT OFFICE.

BETTIE von RAGUÉ, OF CHICAGO, ILLINOIS.

MUSICAL CHART.

1,384,172.  Specification of Letters Patent.  Patented July 12, 1921.

Application filed November 17, 1920. Serial No. 424,624.

*To all whom it may concern:*

Be it known that I, BETTIE VON RAGUÉ, a citizen of the United States, and a resident of Chicago, in the county of Cook and State of Illinois, have invented certain new and useful Improvements in Musical Charts, of which the following is a full, clear, and exact description.

The invention relates to musical charts and its object is to provide one which is adapted to be made up by children in such manner as to be both instructive and interesting to them.

The invention consists in the several novel features hereinafter set forth and more particularly defined by claims at the conclusion hereof.

Figure 1:
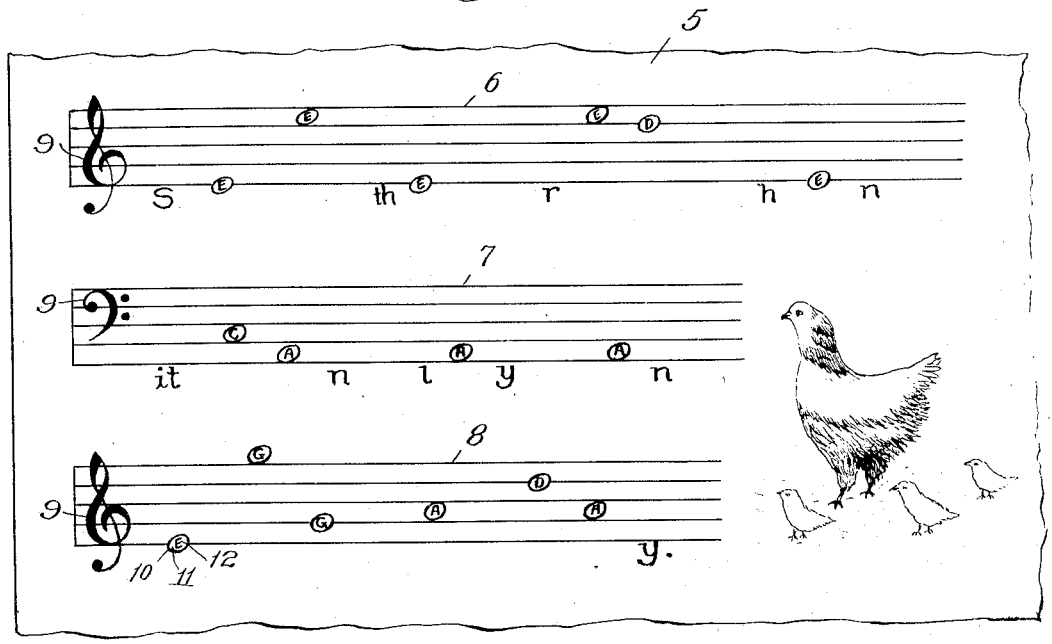
Figure 2:
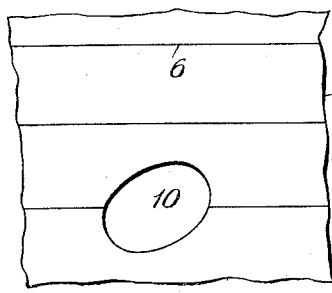
Figure 3:
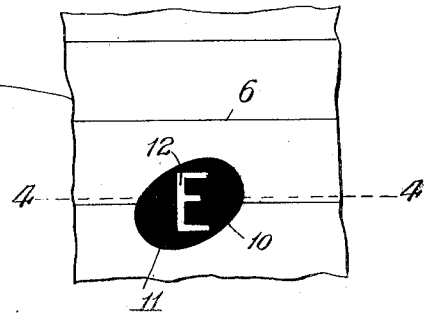
Figure 4:

In the drawings: Figure 1 is a face view of a chart embodying the invention. Fig. 2 is an enlarged view showing one of the openings before a disk has been inserted. Fig. 3 is a similar view with the disk inserted. Fig. 4 is a section taken on line 4—4 of Fig. 3.

In the exemplification of the invention illustrated in the drawings, 5 indicates a sheet of suitable material, such as cardboard, on which is marked a series of staffs 6, 7 and 8 composed of lines spaced as usual for notes and clefs 9. In lieu of printing the notes or words of a song or both directly on the staff, the sheet is provided with openings 10 properly placed for the notes desired to constitute the song or musical composition and adapted to receive disks 11 which indicate the notes and also have marked thereon a letter 12 forming a part of a word in the song. By means of a series of these disks, the notes and words for the entire song may be completed on the sheet. If desired, some of the letters of some of the words may be printed to assist the child in correctly assembling the lettered disk-notes. The disks are formed so that they will be frictionally held in the openings 10.

In the use of the chart, the child successively selects the letters to form the words and places them in the openings in the chart to complete the phrases and until the song has been completed. Assembling of the chart in this way is instructive to the child and, when completed, will be legible to the child. The positioning of the disks in the openings will be instructive to the child in reading the notes and words and will aid the child in learning music.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A musical chart formed of a sheet of material having a staff thereon and provided with perforations in the staff disposed to correspond to the notes of a musical composition in combination with note-indicating disks fitted into the perforations and forming the musical composition, the openings and disks being substantially the same shape so that the disks will be held directly in the openings.

2. A musical chart having a staff thereon provided with perforations in the staff disposed to correspond to the notes of a musical composition in combination with note-indicating disks fitted into the perforations and having letters thereon, the notes and letters forming a musical composition with words.

3. A musical chart comprising a staff having portions of a song printed thereon partly in letters, and having perforations in the staff in combination with note-indicating disks fitting in the perforations and having associated letters thereon to complete the song.

BETTIE von RAGUÉ.